United States Patent [19]
Toedter

[11] Patent Number: 5,092,497
[45] Date of Patent: Mar. 3, 1992

[54] DOSING APPARATUS FOR AN EXACT DECANTING OF FLOWABLE LIQUIDS

[76] Inventor: Manfred Toedter, c/o Schramm, Genterstrasse 6, 28 Bremen 66, Fed. Rep. of Germany

[21] Appl. No.: 572,903

[22] Filed: Aug. 24, 1990

[30] Foreign Application Priority Data

Aug. 25, 1989 [DE] Fed. Rep. of Germany ....... 3928057

[51] Int. Cl.⁵ .......................................... G01F 11/28
[52] U.S. Cl. ................................. 222/434; 222/500; 222/481.5; 222/453
[58] Field of Search ............... 222/288, 434, 442, 453, 222/454, 501, 365, 438, 476, 481.5, 500

[56] References Cited

U.S. PATENT DOCUMENTS

| | | | |
|---|---|---|---|
| 645,706 | 3/1900 | Grant | 222/453 |
| 2,133,679 | 10/1938 | Woeltjen | 222/442 |
| 2,248,958 | 7/1941 | Christensen | 222/453 |
| 2,519,479 | 8/1950 | Koukal | 222/477 |
| 2,532,787 | 12/1950 | Romyns | 222/453 |
| 3,141,585 | 7/1964 | Emmert | 222/434 |
| 3,556,353 | 1/1971 | Echols | 222/309 |
| 3,658,216 | 4/1972 | Schwartzman | 222/453 |
| 3,848,774 | 12/1974 | Schimke | 222/36 |
| 4,273,261 | 6/1981 | Krueger | 222/288 |
| 4,569,463 | 2/1986 | Pellegrino | 222/434 |
| 4,582,230 | 4/1986 | Vierkötter | 222/453 |

FOREIGN PATENT DOCUMENTS

| | | | |
|---|---|---|---|
| 439381 | 1/1927 | Fed. Rep. of Germany | 222/453 |
| 1206752 | 12/1965 | Fed. Rep. of Germany | |
| 3014267 | 10/1981 | Fed. Rep. of Germany | |
| 779586 | 10/1934 | France | 222/453 |
| 1044900 | 11/1951 | France | 222/453 |
| 163246 | 8/1933 | Switzerland | 222/453 |

Primary Examiner—Kevin P. Shaver
Assistant Examiner—Kenneth Bomberg
Attorney, Agent, or Firm—W. G. Fasse

[57] ABSTRACT

A dosing apparatus for the decanting of exactly measured liquid volumes is equipped with a measuring or dosing spout. The spout is connectable to the liquid container. The spout has a through-bore in the form of a cylindrical bore in which a double piston is slidably received for a back and forth movement. Inlet flow passages and outlet flow passages are provided in the walls of the spout. A venting bore extends along the entire length of the spout and a venting hose connected to the venting bore reaches into the container for assuring a pressure equalization. The volume to be measured is determined by the diameter of the bore and by the spacing between two sections of the double piston less the volume of a piston rod interconnecting the two piston sections.

18 Claims, 3 Drawing Sheets

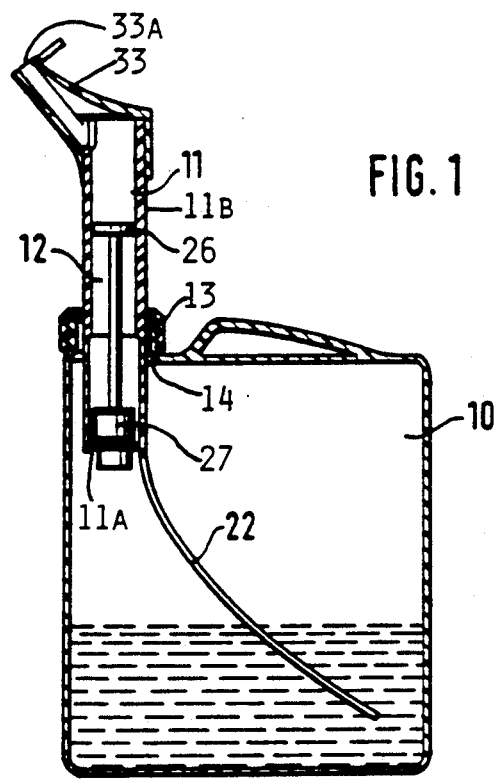
FIG. 1
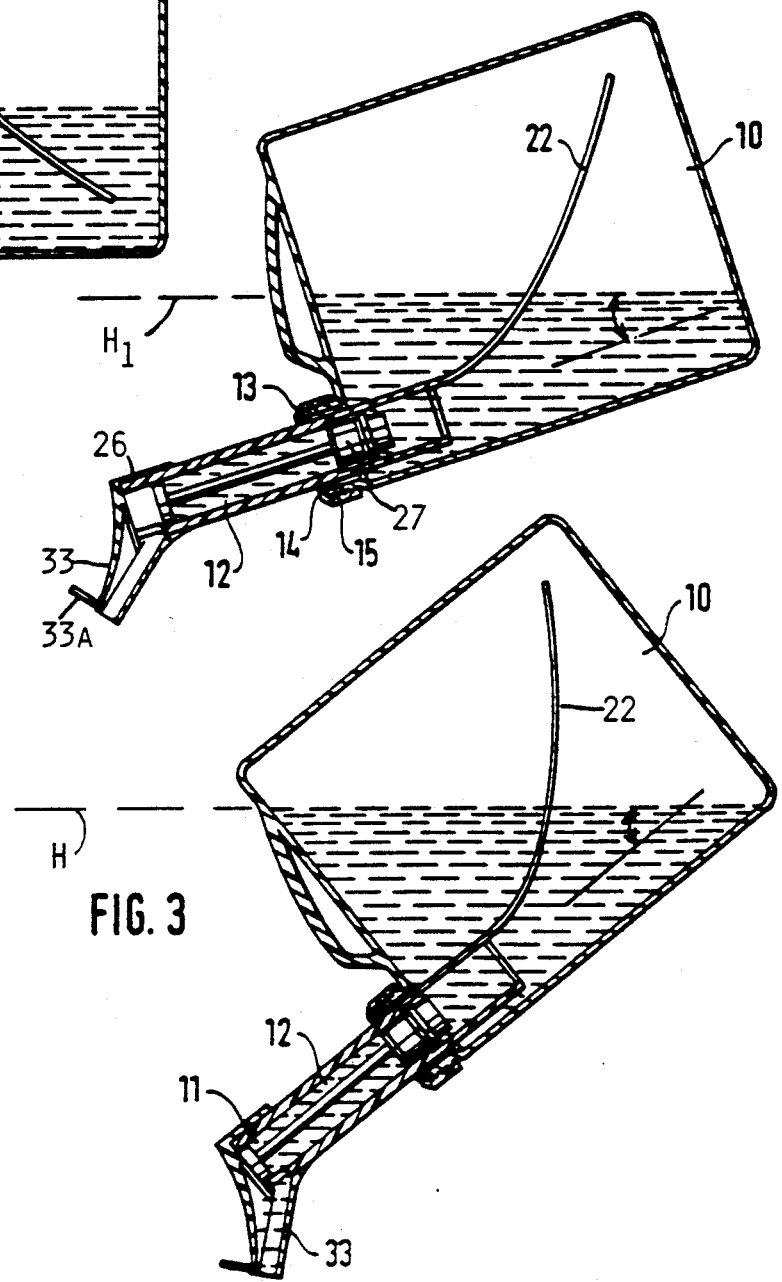
FIG. 2
FIG. 3

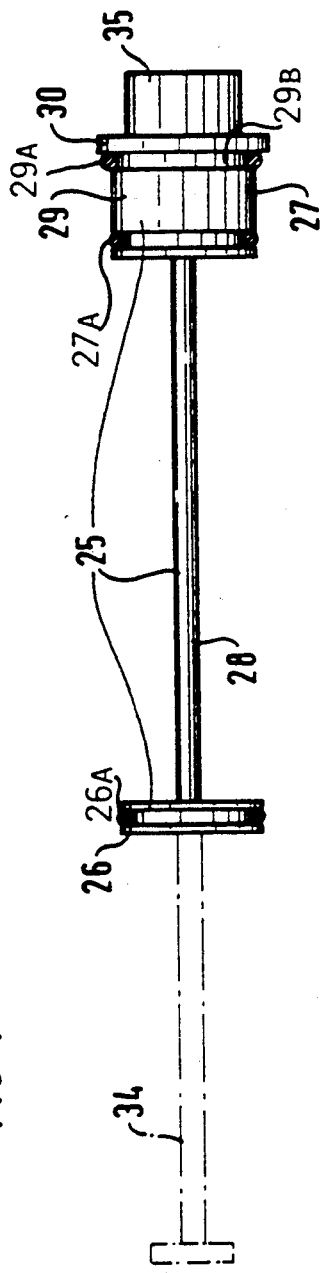
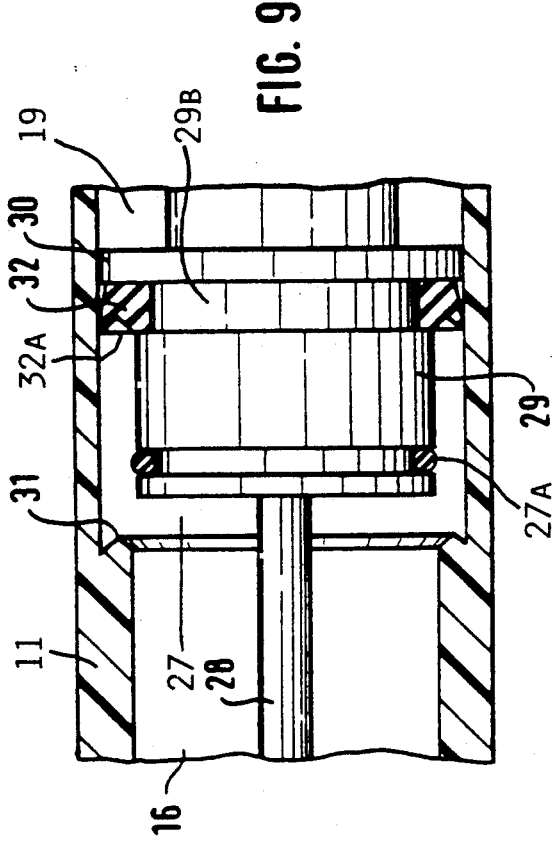
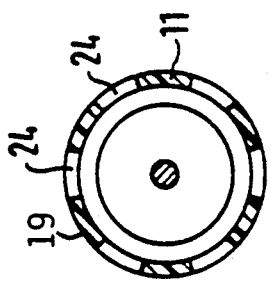

DOSING APPARATUS FOR AN EXACT DECANTING OF FLOWABLE LIQUIDS

FIELD OF THE INVENTION

The invention relates to an apparatus for an exact decanting of flowable liquids. The apparatus has a spout connectable to a container from which precisely measured liquid quantities are to be decanted.

BACKGROUND INFORMATION

Spouts connectable to liquid containers are known in the art. It is also known to decant defined volumes by using a measuring device, such as a measuring beaker which is filled to a desired level for measuring a defined volume of the liquid out of a tank or the like. In this manner it is possible to measure aggressive liquids, such as poisonous liquids, caustic or etching liquids, and any other non-toxic liquids in a required manner. The measuring of liquids with a calibrated beaker is acceptable for laboratory operations or devices in which such measuring beakers are readily available. However, the decanting and using of measured volumes of liquids under other conditions where proper measuring devices are not readily available, provides substantial difficulties. For example, the precise measuring and decanting of liquid plant protection chemicals, detergents, fertilizers, food stuffs, and the like pose substantial difficulties with presently available decanting devices. Similar considerations apply to the refueling of the relatively small fuel tanks of small gasoline engines which are quickly overfilled so that spilling occurs. Thus, in many of these instances it is difficult to decant a precise liquid quantity or volume and frequently, it is not possible to precisely follow the directions for the use of the particular liquid, for example for diluting a plant protection chemical or for measuring of precise ingredients.

U.S. Pat. No. 3,556,353 discloses a pump mechanism for the exact decanting of a flowable liquid. In this reference the pump mechanism is attachable to the neck of a bottle and comprises a decanting spout made of glass provided with a cylinder bore in which a glass piston is received for an axial back and forth movement. The known pumping mechanism includes two ball valves, one of which is arranged in a restriction at the lower end of the cylinder bore, while the other ball valve is positioned in a through-bore at the lower end of the glass piston. The two ball valves assure or establish the suction and pressure conditions occurring during pumping so that while pulling the glass piston, liquid is sucked into a defined volume and so that while pushing the glass piston downwardly, the measured liquid is discharged into a connecting pipe. Thus, the measured volume depends on the stroke and a scale indicates the discharged volumes. Such a device is not very practical for use outside a laboratory.

OBJECTS OF THE INVENTION

In view of the above it is the aim of the invention to achieve the following objects singly or in combination:

to provide a dosing apparatus or device for measuring of an exact volume of a liquid out of a container;

to construct such a device in a simple and rugged manner so that it may be used in many applications while still providing an exact, certain and reliable use of the device;

to construct the device with a gravity responsive element that will open or close a measuring volume to the container to which the device is attached, depending on an angular position of the device relative to the horizontal;

to avoid the use of measuring beakers and to provide a dosing device that may be either gravity operated or manually operated; and to construct the device of materials suitable for the handling of aggressive liquids.

SUMMARY OF THE INVENTION

The dosing device of the invention is characterized by a spout having a hollow bore, preferably a cylindrical bore, in which a double piston is received which is movable either manually or in response to gravity. The spout is provided with an inlet passage or passages at one end connectable to a container, while the other spout end is provided with one or more outlet flow passages. A preferred embodiment is equipped with a venting bore extending all along the entire length of the spout. A nipple may lead into the venting bore for the connection of a venting hose leading into the container from which liquid quantities are to be dispensed. The volume is determined by a space inside the hollow bore in the spout between the two piston sections less the volume of a piston rod interconnecting the two piston sections.

The dosing apparatus according to the invention permits filling the just mentioned defined space with the liquid while holding the container with the spout attached thereto in a first angular position relative to the horizontal and to then close off the defined space toward the container in a second angular position relative to the horizontal. In a vertical condition, or rather position, the double piston preferably closes the container.

The components of the present dosing device may be so dimensioned that several components forming a set may be assembled for measuring of different quantities or volumes of liquid. For this purpose the two piston sections may have different lengths and the inner or rather hollow bore may have different diameters in different spouts. The piston rod may have different diameters.

BRIEF DESCRIPTION OF THE DRAWINGS

In order that the invention may be clearly understood, it will now be described, by way of example, with reference to the accompanying drawings, wherein:

FIG. 1 shows a container with a decanting spout according to the invention held in a vertical position in which the container is closed;

FIG. 2 shows the container of FIG. 1 in a decanting position in which a defined space inside the spout is closed off relative to outlet flow passages, but still open relative to the inside of the container so that the defined space may be filled with liquid from the container;

FIG. 3 shows the container of FIGS. 1 and 2 in a liquid discharge, further inclined position relative to FIG. 2, whereby liquid in the defined space can be discharged through outlet flow openings while the defined space is closed off relative to the container;

FIG. 7 is a view of a double piston used according to the invention, equipped with a piston rod extension forming a manual operating member for the double piston;

FIG. 8 is a sectional view along section line VIII—VIII in FIG. 5; and

FIG. 9 is a sectional view of a piston construction which simultaneously functions as a valving mechanism cooperating with a spout valve seat.

Figure 4:
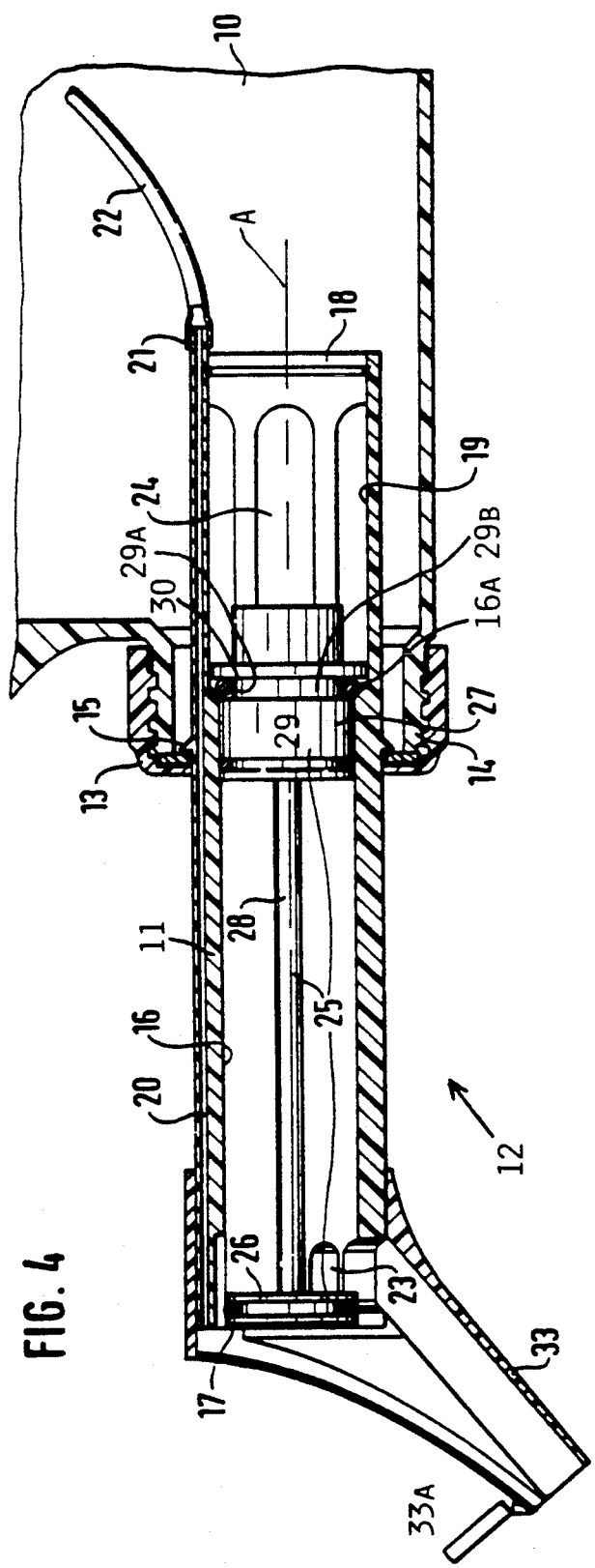
FIG. 4 illustrates, on an enlarged scale, an axial sectional view through the present dosing device in which outlet flow passages are open and inlet flow passages into the defined space are closed for discharging a measured volume through the spout outlet.

DETAILED DESCRIPTION OF PREFERRED EXAMPLE EMBODIMENTS AND OF THE BEST MODE OF THE INVENTION

As shown in FIGS. 1, 2, and 3, a liquid container 10 is equipped with a decanting spout 11. The spout has an inlet end 11a reaching into the container through a container outlet port 14. The spout 11 further has an outlet end 11b merging into an outflow guide member 33. According to the invention, the spout 11 is equipped with a dosing device 12 for the exact decanting of precisely measured liquid volumes. The spout 11 is secured to the outlet port 14 of the container 10 by means of a spigot nut 13 cooperating with a ring collar 15 of the outlet port 14 of the container 10.

Different types of conventional connections may be used to secure the spout 11 to the container 10. Plug-on connections, plug-in connections, clamping connections, and the like are suitable for securing the spout 11 to the container 10. Even a permanent connection may be suitable if the container has a separate inlet filling port.

The dosing device 12 includes a double piston 25 to be described in more detail below. In FIG. 1 the lower piston section closes the inlet port so that fumes or odors cannot escape from the container. The double piston dosing device 12 has a sliding fit inside a hollow, preferably cylindrical bore in the spout 11 so that the piston 25 can move back and forth, for example, under the effect of gravity as shown in FIGS. 2 and 3 or by manual operation as will be explained below with reference to FIG. 7. In FIG. 2 the double piston 25 has assumed a first angular position relative to the horizontal H for filling a defined space with a measured volume of the liquid out of the container 10. In FIG. 3 the longitudinal axis of the spout has assumed a steeper second angular position relative to the horizontal in which the double piston closes the inlet flow passage into the defined space relative to the container while opening the outlet flow passage for the discharge of a measured volume of liquid.

FIG. 4 shows the details of the present dosing device 12. The dosing device 12 comprises an inner hollow bore 16 which is preferably an axial cylindrical bore in the spout 11 and the double piston 25 which comprises a first piston section 26, a piston rod 28, and a second piston section 27, whereby the second piston section 27 is preferably a stepped piston section having two portions 29 and 30, preferably of different diameters. The left-hand piston section 26 has a relatively small axial length and is movable to open or close outlet flow passages 23 extending preferably radially out of the side walls of the spout 11. The second piston section 27 opens and closes the inlet flow passage 18, 24. The second piston section 27 comprises an axially elongated first piston portion 29 having a smaller diameter than a second piston portion 30. The closure piston portion 29 has a diameter corresponding to that of the piston section 26 and further corresponding to the inner diameter of the cylindrical hollow bore 16 to provide for a sliding fit inside the bore 16. For accommodating the larger diameter of the piston portion 30, the spout 11 has a larger diameter bore 19 in its inlet section 18. This larger diameter bore 19 reaches from the inlet 18 to a transition or seat ring 16a between the bore 16 and the bore 19.

The larger diameter bore 19 of the spout 11 is provided with flow passage grooves 24 for permitting flow of liquid from the container 10 into the defined space in the bore 16 between the cylinder sections 26 and 27. In FIG. 4 the position of the second piston section 27 closes the flow passages or grooves 24 because an O-ring 29a in a groove 29b of the piston section 27 rests against the transition ring seat 16a which forms a valve seat.

A different type of valve seat is shown in FIG. 9 in the form of a ridge ring 31 cooperating with a grooved sealing ring 32 in the ring groove 29b. The grooved sealing ring 32 rests with its back against the larger diameter piston portion 30 and in the closed condition the valve seat in the form of the ridge ring 31 engages in a respective groove of the sealing ring 32. This is the case when the filling of the defined space in the bore 16 between the piston sections is completed.

As mentioned above, the left-hand end of the spout 11 is provided with radially extending flow outlet passages 23. The grooves or inlet passages 24 extend preferably axially, but not necessarily.

Further, the spout 11 is equipped with a venting bore 20 extending parallel to the longitudinal axis A of the piston rod 28 all the way to the end of the spout 11 inside the container 10. The inner end of the venting bore 20 has a nipple 21 to which a venting hose 22 is connected, reaching inside the container 10.

Further, as mentioned above, the spout 11 is equipped with an outflow guide member 33 that may be closeable by a hinged cover 33a.

In FIG. 4 the double piston 25 has assumed a position for permitting liquid to flow out of the container 10 through the inlet passage 18 and through the inlet grooves 24 into the defined space formed in the bore 16.

Figure 5:
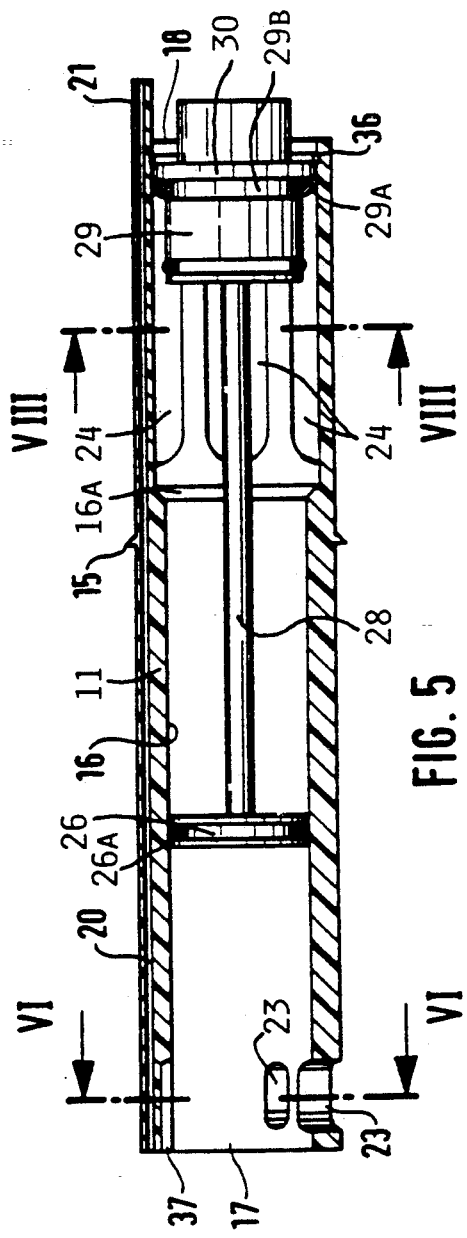
FIG. 5 is a view similar to that of FIG. 4, but showing the spout closed off at its outlet end and opened at its inlet end for filling a defined space with a liquid to be measured and decanted.
Figure 6:
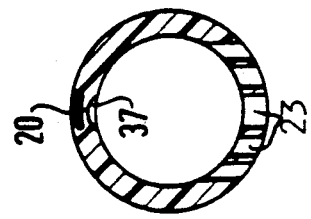
FIG. 6 is a sectional view along section line VI—VI in FIG. 5.

FIG. 6 shows that the outlet flow passages 23 are located only in the lower or downwardly facing portion of the wall of the spout 11. Additionally, FIGS. 5 and 6 in conjunction show the location of the venting bore 20 and a venting slot 37 at the discharge end of the walls forming the spout 11. The venting slot 37 vents the defined space to assure an easy discharge and preferably also an easy filling of the defined space.

FIG. 7 shows a modified double piston which has all the components of the double piston of FIGS. 4 and 5, and which additionally has a piston rod extension 34 that will reach through an axially located hole in the wall of the outflow guide member 33 so that the double piston 25 may be manually operated into the two positions if desired.

FIG. 8 shows the sectional view along section line VIII—VIII in FIG. 5 to illustrate the position of the inlet flow passage grooves 24 in the larger diameter portion 19 of the spout 11. A plurality of such passages 24 will normally be provided.

FIG. 9 shows, as mentioned above, a modified valve seat 31 in the form of a ring ridge cooperating with the sealing ring 32 provided with a groove 32a cooperating with the ring ridge 31.

In operation the container is tilted into a first angular position relative to the horizontal H as shown in FIG. 2, whereby the double piston moves into the position shown in FIG. 2 for filling the defined space surrounded by the wall of the bore 16 and closed at the lower end by the piston section 26 while still open past the valve seat 16a, through the inlet flow grooves 24 permitting liquid from the container 10 to enter into the defined space. For decanting, the container 10 is brought into the second angular position with a larger tilting angle as shown in FIG. 3.

The defined space for measuring an accurate volume of the liquid is determined by the diameter of the cylinder bore 16 and the spacing between the piston section 26, which may be equipped with an O-ring 26a as shown in FIG. 7, and the piston portion 29, less the volume of the piston rod between these piston sections 26 and 27.

After the just defined space has been filled, the further tilting mentioned above causes the double piston 25 to follow gravity, thereby opening the outlet passages 23 and closing the inlet passages 24 by causing the O-ring 29a or the sealing ring 32 to bear against the respective valve seat 16a or 31. The dimensioning of the just mentioned elements and their position relative to each other is such that first the second piston section 27 with its closing portion 29 and its larger diameter portion 30 closes the entrance into the defined space before the piston section 26 opens the outlet passages 23. For this purpose, the piston portion 29 of the piston section 27 is axially longer than the piston section 26 and has the sealing O-ring 27a. The outlet passages 23 are slightly spaced from the end 17 of the spout 11 so that in the end position the piston section 26 closes the end 17 while permitting outflow through the passages 23. The venting slot 37 is so positioned that it reaches into the defined dosing space inside the bore 16 to permit a rapid discharge of the measured liquid volume, and also a proper filling of the defined space.

In all embodiments the sealing ring 27a closes the defined space before any discharge of liquid from the defined space, so that liquid from the container 10 is then prevented from flowing into the defined space.

FIG. 7 shows a modification in which the piston rod 28 has an extension 34 reaching outside of the flow guide member 33 for a manual operation of the double piston 25, thereby permitting the repetition of a dosing and discharge operation without even bringing the container back into the position of FIG. 1.

Combining the venting bore 20 and the venting slot 37 as shown in FIGS. 5 and 6 is especially practical, but the invention is not limited to this possibility. The container 10 itself may have a separate venting opening. However, the venting slot 37 must be so positioned that it vents the defined space inside the bore 16 especially when the discharge passages 23 are in fact open for a discharge.

The present dosing device is especially suitable for being manufactured in sets with standardized dimensions so that different defined spaces may, for instance, be formed by inserting into one standard central axial bore at different times different double pistons which differ from one another by having different diameter piston rods. In fact, the pistons may have threaded bores and different diameter piston rods may have standardized threaded ends for connecting the same piston sections to different diameter piston rods. Also, different bore diameters may be employed with respective different piston diameters.

The spout 11 itself and the double piston 25 are preferably made of materials which are resistant against aggressive liquids, such as acids, bases, fuels, and the like. Further, it is practical to make the double piston 25 or at least the second section 27 of a material having a sufficient density to provide the required piston weight so that the piston may be responsive to the tilting movements explained above with reference to FIGS. 2 and 3. For this purpose a dead weight 35 may be part of the second piston section 27.

The above mentioned seals 26a, 27a, and 29a, as well as 32 are conventional O-rings or grooved rings as shown at 32. In any event, these rings will be made of materials that are resistant against the liquids to be handled.

In addition to the above mentioned exchangeability of the piston rod 28, it is possible to change the length of the piston sections 26, 27 to again provide an ability to change the defined measuring space.

At the inlet end 18 of the spout 11, there is a groove which receives a retaining spring ring 36 for providing a right-hand end stop for the piston portion 30. Thus, by removing the spring ring 36, it is easy to exchange the double piston.

The above described features make it possible to precisely determine the volume to be discharged. Where larger volumes are to be discharged, it is possible to increase the diameter of the bore 16 substantially outside the port of the container. In such an embodiment, the left-hand piston section 26 is removable through the spout end 17 and can be exchanged against a piston section of larger or smaller axial length to again provide some modification of the volume to be discharged. Otherwise, the just mentioned embodiment operates in the manner described. As long as the double piston has the required weight or if it is intended to operate it manually only, it is possible to construct the two piston sections as hollow pistons that are formed as containers.

Although the invention has been described with reference to specific example embodiments it will be appreciated that it is intended to cover all modifications and equivalents within the scope of the appended claims.

What is claimed is:

1. A dosing apparatus for an exact decanting of a liquid from a container having an outlet port, comprising decanting spout means having an inlet end connectable to said outlet port and an outlet end for discharging a measured quantity of liquid, a hollow bore axially through said decanting spout means, double piston means axially movable in said hollow bore, said double piston means and said hollow bore enclosing a defined space for holding a measured liquid volume to be decanted, outlet flow passage means for admitting liquid from said defined space, inlet flow passage means for admitting liquid from said container into said defined space when said double piston means is in a first position in which said outlet flow passage means is closed while said inlet flow passage means into said defined space is open for said admitting of liquid into said defined space, said double position means taking up a second position for opening said outlet flow passage means while closing said inlet flow passage means and wherein said hollow bore of said spout means is a cylindrical bore having a smaller inner diameter bore section near said outlet flow passage means and a larger inner diameter bore section near said inlet flow passage means, said double piston means comprising a first piston section fitting into said smaller diameter bore section with a sliding fit for closing said outlet flow passage means, and a second stepped piston section, a piston rod interconnecting said first and second piston sections, said second stepped piston section having a first piston step with a diameter slidably fitting into said smaller diameter bore section and a second piston step slidably fitting into said larger diameter bore section, whereby said first piston section and said first piston step have the same diameter.

2. The apparatus of claim 1, further comprising first venting means (20) through said decanting spout means for venting said container when said decanting spout means are secured to said container.

3. The apparatus of claim 2, wherein said first venting means comprise a nipple for securing a venting hose to said venting means, said venting hose reaching into said container.

4. The apparatus of claim 1, wherein said first piston section has a short axial length on said piston rod for closing said outlet flow passage means when said inlet flow passage means are open, said second stepped piston section having a longer axial length than said short axial length for closing said defined space when said outlet flow passage means are open and for opening said defined space when said outlet flow passage means are closed.

5. The apparatus of claim 1, further comprising a valve seat in said hollow bore located at a transition between said larger inner diameter section of said hollow bore and said smaller inner diameter section of said hollow bore, said second stepped piston section cooperating with said valve seat when said inlet flow passage means are closed.

6. The apparatus of claim 5, wherein said valve seat is a ring ridge (31) and wherein said second stepped piston section of said double piston means carries a sealing member (32) for cooperation with said ring ridge of said valve seat.

7. The apparatus of claim 1, wherein said hollow bore is a cylindrical bore and wherein said piston rod of said double piston means and said cylindrical hollow bore each have a diameter selected for determining said defined space, and wherein said first and second piston sections are spaced from each other along said piston rod by a length which also determines said defined space between said first and second piston sections inside said cylindrical hollow bore less a volume of said piston rod between said first and second piston sections.

8. The apparatus of claim 1, wherein said outlet flow passage means and said inlet flow passage means are arranged relative to each other and relative to said double piston means so that opening of said outlet flow passage means (23) takes place after closing said inlet flow passage means.

9. The apparatus of claim 8, wherein said inlet flow passage means are axially extending grooves (24) near said hollow bore in said inlet end of said spout means, and wherein said outlet flow passage means are substantially radially extending holes (23) through said outlet end of said spout means.

10. The apparatus of claim 1, wherein said spout means comprise an external ring collar (15) for exchangeably securing said spout means to said outlet port of said container.

11. The apparatus of claim 1, comprising a plurality of said spout means having different internal diameters for said hollow bore, said spout means being exchangeable against each other, and a plurality of said double piston means having different coordinated dimensions, said piston means also being exchangeable against each other for forming different defined spaces for measuring different liquid volumes.

12. The apparatus of claim 11, wherein said first and second piston sections of said double piston means are exchangeable piston sections mounted on said piston rod, said exchangeable piston sections having different axial lengths for changing said defined space.

13. The apparatus of claim 1, wherein said spout means and said double piston means are made of a material that is resistant against aggressive liquids.

14. The apparatus of claim 1, further comprising an operating member arranged for manually operating said double piston means.

15. The apparatus of claim 14, wherein said piston rod of said double piston means comprises a rod extension extending out of said spout means for forming said operating member.

16. The apparatus of claim 1, wherein said double piston means have a sliding fit in said hollow bore, said double piston means being made of a material having a density sufficient for assuring gravity responsive movements of said double piston means depending on said first and second positions which are different angular positions relative to the horizontal.

17. The apparatus of claim 1, wherein said double piston means comprise circumferential ring grooves and O-ring seals in said ring grooves.

18. The apparatus of claim 1, further comprising second venting means (37) for said defined space, said second venting means (37) being effective when filling said defined space and when discharging from said defined space.

* * * * *

UNITED STATES PATENT AND TRADEMARK OFFICE
CERTIFICATE OF CORRECTION

PATENT NO. : 5,092,497
DATED : March 3, 1992
INVENTOR(S) : Manfred Toedter

It is certified that error appears in the above-identified patent and that said Letters Patent is hereby corrected as shown below:

On the Title page,
Item [76], should read as follows:

--Manfred Toedter, Neuenkirchen,
Federal Republic of Germany--

Column 6, line 60, replace "admitting" by --discharging--;

Column 6, line 67, replace "position" (first occurrence) by --piston--.

Signed and Sealed this

Twenty-fifth Day of May, 1993

Attest:

MICHAEL K. KIRK

Attesting Officer

Acting Commissioner of Patents and Trademarks